(12) United States Patent
Menhardt

(10) Patent No.: US 6,473,488 B2
(45) Date of Patent: Oct. 29, 2002

(54) THREE DIMENSIONAL IMAGE RECONSTRUCTION FROM SINGLE PLANE X-RAY FLUOROGRAMS

(75) Inventor: Wido Menhardt, Los Gatos, CA (US)

(73) Assignee: Cedara Software Corp., Mississauga (CA)

(*) Notice: Subject to any disclaimer, the term of this patent is extended or adjusted under 35 U.S.C. 154(b) by 104 days.

(21) Appl. No.: 09/742,050

(22) Filed: Dec. 20, 2000

(65) Prior Publication Data
US 2002/0106052 A1 Aug. 8, 2002

(51) Int. Cl.⁷ .................................................. A61B 6/00
(52) U.S. Cl. ......................................... 378/62; 378/901
(58) Field of Search ................................ 378/4, 10, 62, 378/98, 901

(56) References Cited

U.S. PATENT DOCUMENTS

| | | |
|---|---|---|
| 4,101,961 A | 7/1978 | Reiber |
| 4,422,146 A | 12/1983 | Yamaguchi et al. |
| 4,630,203 A | 12/1986 | Szirtes |
| 4,672,651 A | 6/1987 | Horiba et al. ............... 378/62 |
| 4,875,165 A | 10/1989 | Fencil et al. |
| 5,065,435 A | 11/1991 | Oe |
| 5,107,838 A | 4/1992 | Yamaguchi |
| 5,274,549 A | 12/1993 | Almasi |
| 5,408,511 A | 4/1995 | Grangeat et al. ............. 378/19 |
| 5,421,331 A | 6/1995 | Devito et al. |
| 5,435,310 A | 7/1995 | Sheehan et al. |
| 5,442,672 A | 8/1995 | Bjorkholm et al. ............ 378/4 |
| 5,457,754 A | 10/1995 | Han et al. |
| 5,570,430 A | 10/1996 | Sheehan et al. |
| 5,588,033 A | 12/1996 | Yeung ........................... 378/4 |
| 5,601,084 A | 2/1997 | Sheehan et al. |
| 5,617,459 A | 4/1997 | Makram-Ebeid et al. ..... 378/62 |
| 5,669,382 A | 9/1997 | Curwen et al. |
| 5,699,799 A | 12/1997 | Xu et al. |
| 5,734,739 A | 3/1998 | Sheehan et al. |
| 5,802,133 A | 9/1998 | Kawai et al. .................. 378/4 |
| 5,871,019 A | 2/1999 | Belohlavek |
| 5,889,524 A | 3/1999 | Sheehan et al. |
| 5,903,664 A | 5/1999 | Hartley et al. |
| 6,031,374 A | 2/2000 | Epstein et al. |
| 6,038,466 A | 3/2000 | Haselhoff |
| 6,047,080 A | 4/2000 | Chen et al. |

OTHER PUBLICATIONS

Harold Sandler, M.D. and Harold T. Dodge, M.D., Experimental and Laboratory Reports—The use of single plane angiocardiograms for the calculation of left ventricle volume in man, AM.HEARTJ, vol. 75, No. 3, Mar. 1968, pp. 325–334.

Primary Examiner—David V. Bruce
(74) Attorney, Agent, or Firm—Pearne & Gordon LLP

(57) ABSTRACT

A method is provided to reconstruct the three-dimensional image of an X-ray contrast agent-filled object having at least one plane of symmetry using a single plane two-dimensional X-ray projection. The projection is obtained by irradiating the object with X-rays substantially perpendicular to a selected plane of symmetry of the object. The absorbance value of each pixel in the projection, which is related to the distance travelled by the X-ray within the object, is then divided by 2 to define the z coordinates on each side of the x-y plane of symmetry of the object. The z coordinates together with the x,y coordinates of each pixel define the three-dimensional contour of the object.

21 Claims, 3 Drawing Sheets

THREE DIMENSIONAL IMAGE RECONSTRUCTION FROM SINGLE PLANE X-RAY FLUOROGRAMS

The present invention relates to a method for obtaining three-dimensional images of anatomical structures by reconstruction of two-dimensional X-Ray fluorograms.

BACKGROUND OF THE INVENTION

X-ray imaging is widely used to image internal organs for diagnostic purposes and to assist health practitioners during therapeutic interventions. In particular, this technique has found many applications in cardiology. For example, many intraventricular interventional cardiac procedures such as Direct Myocardial Revascularization and electro physiological mapping and ablation are conducted under X-ray fluoroscopy.

X-ray fluorograms are two-dimensional projections of anatomical structures. While these images provide useful information they do not allow the resolution of the three-dimensional shape of these structures. Cardiologists typically overcome the deficiencies of the fluorograms by combining the 2-D information of X-ray fluorograms with their knowledge of anatomy to perform (therapeutics) cardiac procedures. This method has the disadvantage of relying heavily of the experience and knowledge of the practitioner.

Three-dimensional X-ray images of internal organs can be obtained using X-ray computed tomography. In this technique, a large number of projections is obtained from different angles and using image reconstruction techniques it is possible to reconstruct the image of an organ. This technique however requires long acquisition times and is not compatible with therapeutic interventions requiring "real time" information about the position of surgical instruments within an organ for example.

Bi-plane X-ray fluorograms can be used to determine the 3-D position of individual points such as the tip of a catheter. By obtaining several 3-D position of a catheter it is possible to produce a 3-D map of an organ such as a ventricle for example. However, this technique requires the use of an additional tool (the catheter) and furthermore the resulting map is not integrated with the fluorogram. Bi-plane fluorograms have also been used to derive 3-D images without the use of positional indicators as described in U.S. Pat. No. 4,672,651. This document describes an image reconstruction method based on a relaxative correction algorithm of projections-backprojections that requires extensive image processing.

The instant invention overcomes the limitations of the prior art by providing a method for rapidly reconstructing the three dimensional image of an object using a single plane two dimensional X-ray projection image.

SUMMARY OF THE INVENTION

In one aspect of this invention there is provided a method for reconstructing the three dimensional (3-D) image of an object, symmetric about at least one plane, from a single two dimensional (2-D) X-ray projection image.

According to the method, an X-ray projection image is obtained with X-ray contrast agent filling the object. In this image, the intensity of each pixel (x,y) represents the X-ray absorbance of the contrast agent within the object. From this absorbance value, the distance travelled by the X-ray within the object can be calculated and the 3 dimensional image of the object reconstructed.

The invention thus relates to a method for the three dimensional image reconstruction of single plane 2-dimensional X-ray image projection of an object having at least one plane of symmetry comprising: substantially uniformly filling the object with an X-ray contrast agent said contrast agent having a pre-selected concentration and absorption coefficient; irradiating said contrast agent-filled object with X-rays substantially perpendicular to said at least one plane of symmetry of the object;detecting said X-rays transmitted through said contrast agent-filled object to define a 2-dimensional projection image with pixels (x,y) having an intensity related to the absorbance of said contrast agent-filled object; processing said 2-dimensional projection image to reconstruct the 3-dimensional image of said object, said processing including determining a distance $D(x,y)$ travelled by said X-rays in the contrast agent-filled object by dividing the absorbance corresponding to the intensity of each pixel (x,y) by the concentration of the contrast agent within said object and multiplying the result thus obtained by the absorption coefficient of said contrast agent; dividing said distance $D(x,y)$ by 2 to define a (+z) coordinate (equals to $+D(x,y)/2$) and a (−z) coordinate (equals to $-D(x,y)/2$) for each pixel (x,y); such that for each pixel (x,y) there is:

1) a (+z) coordinate=$+D(x,y)/2$ and
2) a (−z) coordinate=$-D(x,y)/2$;

and using the x,y,z coordinates thus determined to reconstruct the 3 dimensional image in a 3-dimensional axis system in which the x-y plane is parallel to the plane of symmetry of said object;

In a further embodiment, X-ray projection images are obtained with and without X-ray contrast agent filling the object (called the mask and live images respectively) and the mask image is subtracted from the corresponding live image. In the resulting final 2-dimensional projection image, each pixel (x,y) represents the X-ray absorbance of the contrast agent within the object. From this absorbance value, the distance travelled by the X-ray within the object can be calculated and the 3 dimensional image of the object reconstructed.

The invention thus also relates to a method for the three dimensional image reconstruction of single plane 2-dimensional X-ray image projection of an object having at least one plane of symmetry comprising:irradiating said object with X-rays substantially perpendicular to said at least one plane of symmetry of the object; detecting said X-rays transmitted through said object to define a 2-dimensional projection mask image with pixels (x,y) having an intensity related to the absorbance of said object; substantially uniformly filling the object with an X-ray contrast agent said contrast agent having a pre-selected concentration and absorption coefficient; irradiating said contrast agent-filled object with X-rays substantially perpendicular to said at least one plane of symmetry of the object; detecting said X-rays transmitted through said contrast agent-filled object to define a 2-dimensional projection live image with pixels (x,y) having an intensity related to the absorbance of said contrast agent-filled object; subtracting said mask image from said live image to obtain a 2-dimensional final image; processing said 2-dimensional final image to reconstruct the 3-dimensional image of said object, said processing including determining a distance $D(x,y)$ travelled by said X-rays in the contrast agent-filled object by dividing the absorbance corresponding to the intensity of each pixel (x,y) by the concentration of the contrast agent within said object and multiplying the result thus obtained by the absorption coefficient of said contrast agent; dividing said distance $D(x,y)$ by 2 to define a (+z)

coordinate (equals to +D(x,y)/2) and a (−z) coordinate (equals to −D(x,y)/2) for each pixel (x,y); such that for each pixel (x,y) there is:

1) a (+z) coordinate=+D(x,y)/2 and
2) a (−z) coordinate=−D(x,y)/2;

and using the x,y,z coordinates thus determined to reconstruct the 3-dimensional image in a 3-dimensional axis system in which the x-y plane is parallel to the plane of symmetry of said object;

BRIEF DESCRIPTION OF THE DRAWINGS

These and other features of the invention will become more apparent from the following description in which reference is made to the appended drawings wherein.

DESCRIPTION OF PREFERRED EMBODIMENT

The present invention will be further illustrated in the following description. However it is to be understood that the examples provided herein are for illustrative purposes only, and should not be used to limit the scope of the present invention in any manner. Thus, although the present description will emphasize imaging of the human heart and more particularly of the left ventricle, it also encompasses methods for imaging any object amenable to X-ray imaging using the present method.

Figure 1:
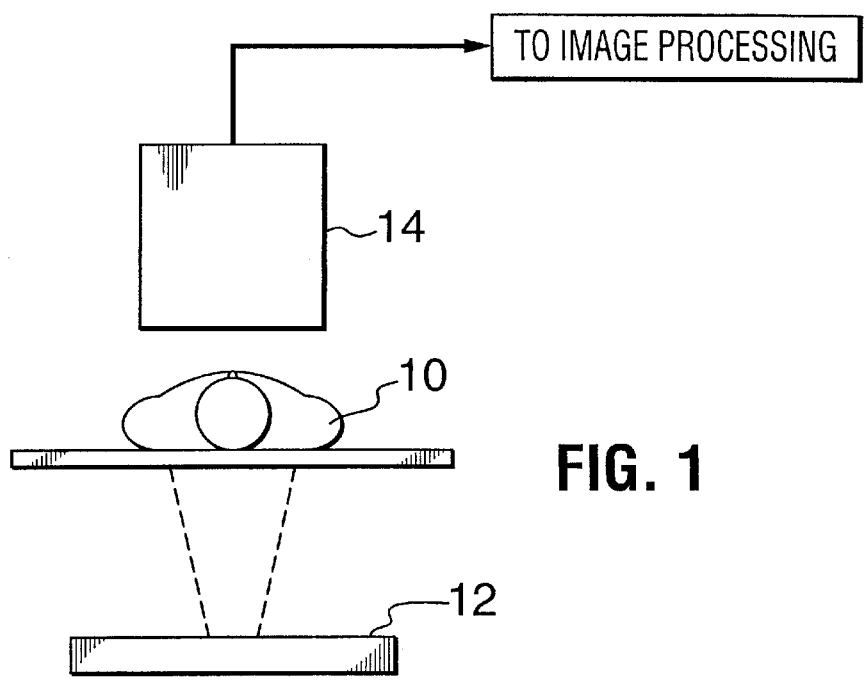
FIG. 1 illustrates a preferred arrangement for imaging the left ventricle of a patient.

Referring to FIG. 1 the general arrangement of an imaging system is shown. A patient 10 having an X-ray source 12 located at his back and an image intensifier X-ray sensitive screen 14 located in front of his chest are shown.

Figures 2A, 2B:
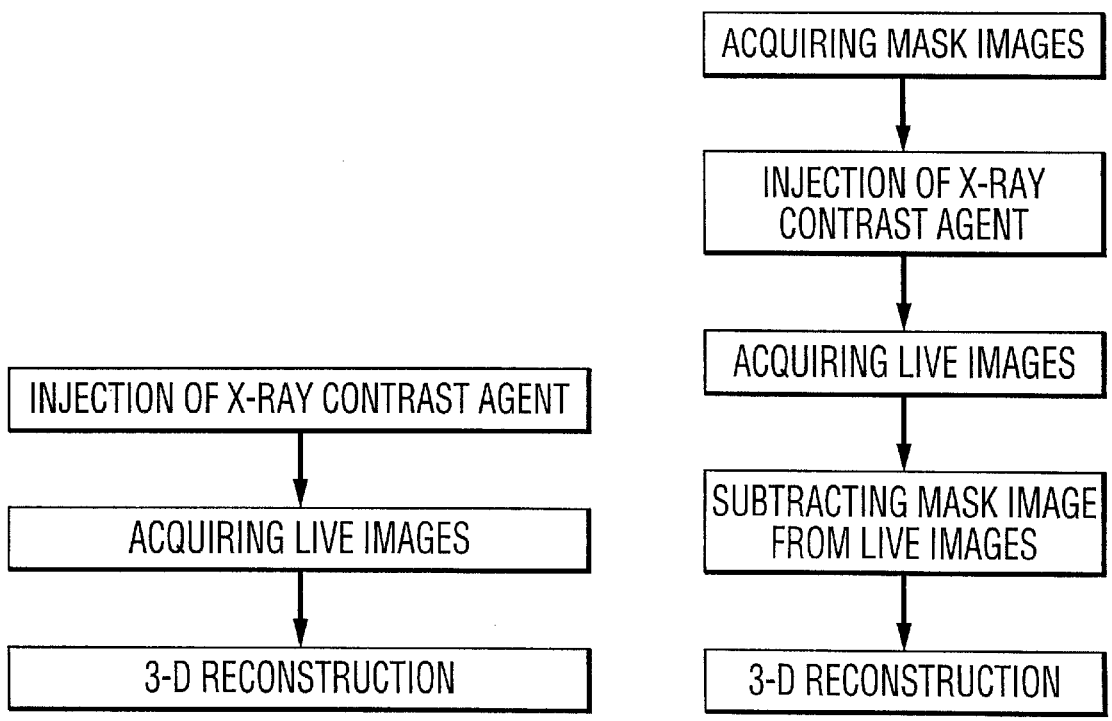
FIG. 2A is a flow chart diagram of the steps involved in the three dimensional image reconstruction of the instant invention.
FIG. 2B is a flow chart diagram of the steps involved in the three dimensional image reconstruction of the instant invention in the embodiment using mask images.

In FIG. 2A is a flow chart diagram outlines the steps leading to the production of a 3 dimensional (3-D) image using the method of the instant invention. A 3-D image of an object symmetric about at least one plane is reconstructed starting from a single plane 2-dimensional (2-D) X-ray image projection. First, an X-ray contrast agent is injected in the object by a selected means. Then, a series of live images with the contrast agent substantially uniformly filling the object is acquired. Finally, the 2-D images thus obtained are transformed into 3-D images by a method that will be described below.

In a preferred embodiment as outlined in FIG. 2B, a series of mask images is acquired without X-ray contrast agent prior to injecting the contrast agent. In this embodiment, the 3-D image is then reconstructed as follows: A series of mask images is first acquired without X-ray contrast agent. Then, an X-ray contrast agent is injected in the object by a selected means followed by the acquisition of a series of live images with the contrast agent substantially uniformly filling the object. The mask images are then subtracted from the corresponding live images. Finally, the 2-D images thus obtained are transformed into 3-D images.

It will be appreciated that in the case where the object is an organ, the injection of contrast agent can be performed before acquiring mask images so long as the mask images are acquired before the contrast agent reaches the organ.

The live images are preferentially acquired while substantially no contrast agent is outside of the object being imaged. In one embodiment of the instant method this can be accomplished for acquiring single plane 2-D X-ray images of the left ventricle by injecting the contrast agent intravenously (IV) and obtaining first pass images. For the purpose of this description first pass images means acquiring X-ray images immediately after the contrast agent has entered the left ventricle and before the contrast agent is substantially ejected from the ventricle at the end of the cardiac cycle.

In a further embodiment, images of the left ventricle can be obtained by injecting the contrast agent by intracardiac route (IC) and obtaining images before a substantial amount of the agent has been ejected from the ventricle at the end of the cardiac cycle. Other methods of X-ray contrast agent administration are also contemplated in the instant invention. The method will depend on the organ or tissue being imaged as would be obvious to one skilled in the art and may include, but are not limited to, intramuscular (IM) and intraarterial (IA) routes. X-ray contrast agents are well known in the art and include, but are not limited to, iodine-containing compounds.

Figure 3:
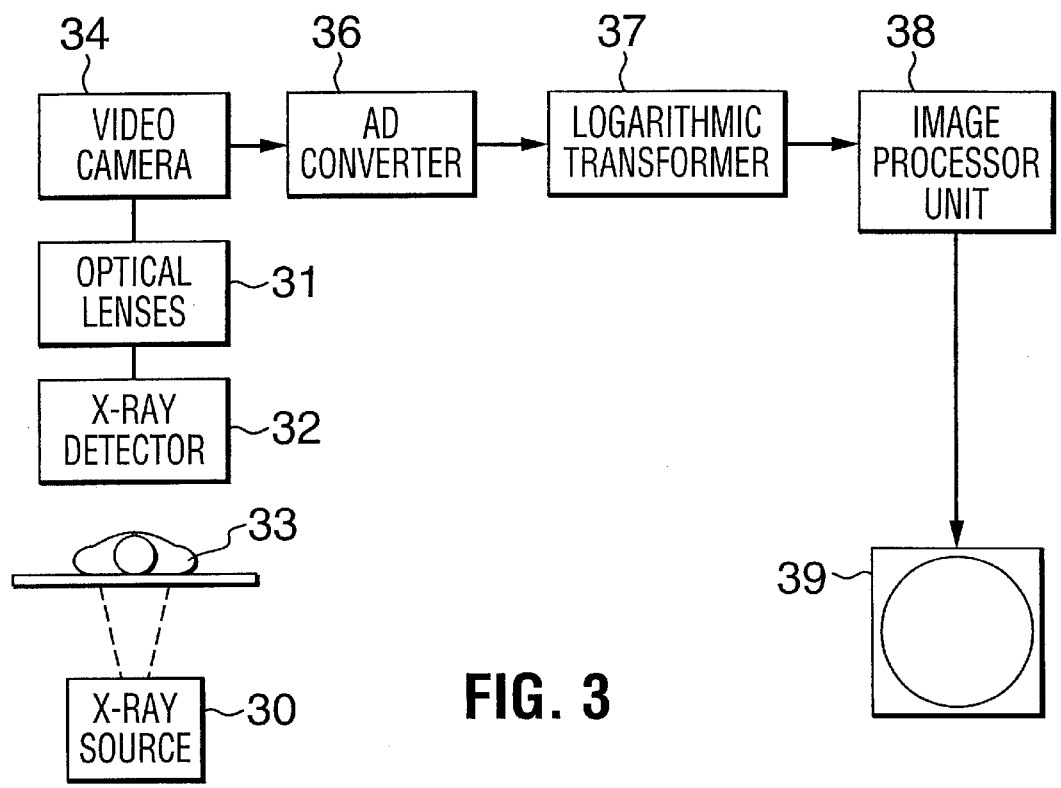
FIG. 3 is a schematic representation of the imaging system.

X-ray sensitive films can be used to record X-rays transmitted through the object being imaged. However, in a preferred embodiment of this invention, the intensity of X-rays transmitted through an object is recorded on an image intensifier screen which can be a fluorescent screen although other type of screens can be used and are well known in the art. Images acquired on fluorescent screens are referred to as fluorograms. These screens allow the rapid acquisition of multiple frames, an essential characteristic to image moving object such as the heart. The following is a description of a typical imaging system and is schematically represented in FIG. 3 for explanatory purposes only and is not intended to restrict the scope of the invention. Other arrangements as would be obvious to one skilled in the art are also considered to be within the scope of the invention. The X-ray source 30 generates X-rays upon application of a high voltage. The X-ray detector 32, which is an image intensifier, detects X-rays transmitted through the object 33. The detector 32 also functions to electron-multiply the detected X-rays for conversion into an optical image. It is preferable that the size of the X-ray detecting surface of the X-ray detector 32 can cover that part of the X-rays which are transmitted through the object 33. A TV (video) camera 34 is coupled to the X-ray detector 32 through an optical lens 31 to convert the optical image into an electrical signal. The TV camera 34 is controlled in a well known manner by a TV camera controller which in turn amplifies suitably the electrical output signal of the TV camera 34. The amplified signal is converted into a digital value by an A/D converter 36, and a logarithmic transformer 37 transforms the digital output of the A/D converter 36 into a logarithmic value which represents X-ray absorbance of the object 33. The logarithmic output of the logarithmic transformer 37 is applied to an image processor unit 38 which converts the signal into an image displayed on screen 39. Alternatively, the A/D conversion may be carried out after the logarithmic conversion. Such an imaging system can acquire images at approximately 30 screens/second.

Figure 4:
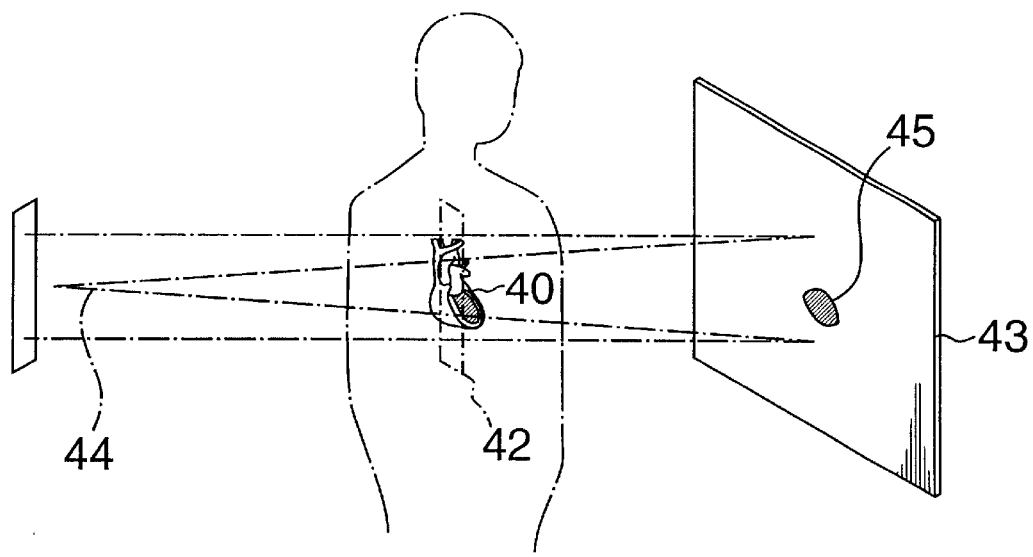
FIG. 4 illustrates how a single plane two dimensional image of the left ventricle can be obtained along a plane of symmetry.

The method for reconstructing the 3-D image of an object starting with a single plane 2-D X-ray image will now be described with reference to FIG. 4. The method is based on the assumption that the object being imaged is symmetric about at least one plane. The method will be described for the 3-D reconstruction of the left ventricle. A left ventricle (LV), schematically represented as 40, with a plane of symmetry 42 coincident with its long axis (parasternal long axis) is shown. A 2-D fluorogram 43 is obtained by irradiating the ventricle with X-rays 44 having intensity $I_o$. The projection of the left ventricle is shown at 45. The path of the X-rays within the ventricle is substantially perpendicular to the plane of symmetry. The preferred orientation for performing the fluorogram is the anterior-posterior (A-P) plane of projection of the left ventricle. However, the ventricle is assumed to be symmetric relative to all planes coincident with its long axis. Therefore, other planes of projection such as, but not limited to, right anterior oblique (RAO), lateral and the like may be used.

The X-rays are partly absorbed with in the ventricle by the X-ray contrast agent and exit the ventricle with a reduced intensity I. The ratio $I_o/I$ is logarithmically proportional to the path length of the X-rays within the ventricle according to the following relationship:

$$\text{Log } I_o/I = \epsilon c D(x,y) \tag{1}$$

Thus the logarithm of the ratio of the intensity of the incoming X-rays to the intensity of the transmitted X-rays at a position (x,y) is proportional to the absorptivity coefficient $\epsilon$ of the contrast agent, the concentration c of the contrast agent and the distance D(x,y) travelled by the X-ray within the ventricle.

It will be appreciated that even if the shape of the X-ray beam is "cone-like", the beam path within the object may still be substantially perpendicular to the plane of symmetry. In this respect, it will be appreciated that the projection image may be larger than the actual object and that the position (x,y) refers to the coordinates at which a particular X-ray impinges on the detector (plane of projection) and not the coordinates of the plane of symmetry.

Figure 5:
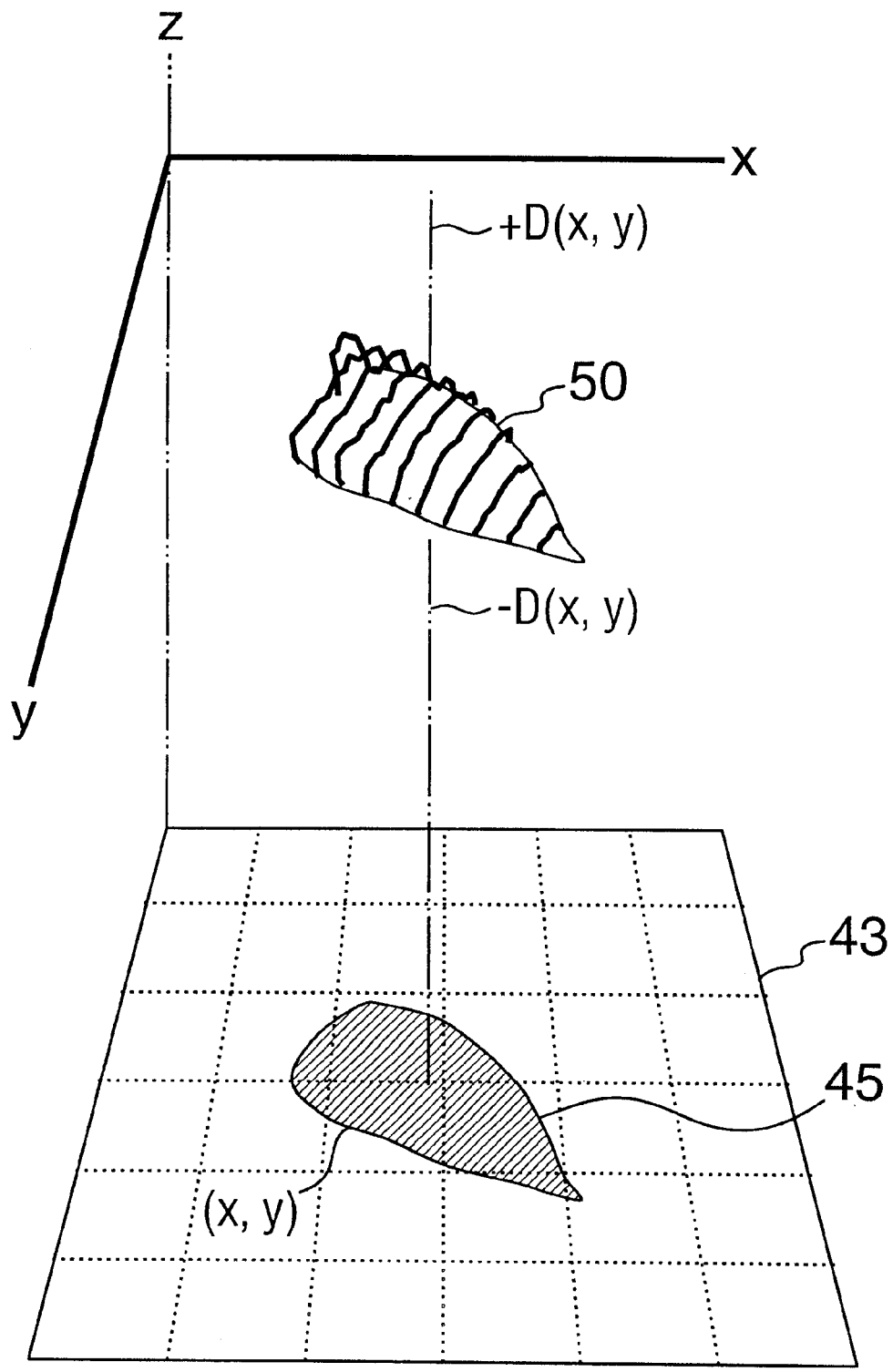
FIG. 5 illustrates how a single plane two dimensional image is reconstructed in a three dimensional system to yield a three-dimensional image of the object.

If the concentration of the contrast agent within the organ being imaged is known, then equation 1 can be directly applied to find the distance D(x,y) for each pixel (x,y). The ventricle is then reconstructed into the corresponding 3-D image as follows: With reference to FIG. 5, the single plane 2-D projection image 45 is projected pixel by pixel in an orthogonal direction into an x-y plane parallel to the plane of symmetry of the ventricle. The coordinate z for each pixel (x,y) is calculated by dividing D(x,y) by 2 to obtain the +z and −z coordinates. The resulting reconstruction is shown at 50. The walls of the ventricle are thus define by the family of points (x,y, +D(x,y)) and (x,y,−D(x,y)). This reconstruction is based on the assumption that the ventricle is symmetric about the x-y plane. The reconstructed image is the n displayed.

The concentration of the contrast agent within the object may not be known. In a further embodiment of the invention the concentration of the contrast agent within the object may be estimated as follows: The concentration c represents the number of absorbing contrast agent particles per unit volume. Equation 1 can then be rewritten as $$\text{Log} I_0/I = \varepsilon \frac{\text{\# absorbing particles}}{V} D(x, y) \tag{2}$$

or $$\text{Log} I_0/I = \varepsilon \frac{\text{\# absorbing particles}}{S} \tag{3}$$

where S represents unit surface and V is unit volume. Thus by integrating the absorbance (Log $I_o/I$) over the entire surface of the projection image and dividing by $\epsilon$ the total number of absorbing particles of the contrast agent can be obtained. The concentration is then calculated by dividing the number of particle by the volume of the ventricle.

In one aspect of the invention the volume of the ventricle can be closely approximated by using the following formula (derived from Sandier H. and Dodge H. T. Am. Heart J., 1968;75:325–338):

$$V = \frac{8S^2}{3\pi L} \tag{4}$$

where S is the surface of the 2-D projection image and L is the length of the principal axis of the ventricle obtained from the projection image.

A further embodiment of the instant invention is provided to determine the concentration of the contrast agent. Assuming that the object is substantially ellipsoid, a first image projection is obtained at a 90° angle relative to the plane of symmetry used for image reconstruction and a second projection is obtained parallel to the plane of symmetry. The maximum width of the projection image correspond to the path length D(x,y) at which maximum absorption is observed for the image obtained parallel to the plane of symmetry. Using this value of D(x,y), equation 1 can be applied to determine the concentration of the contrast agent and, assuming uniformity of the concentration, the image can be reconstructed using the above described method.

It will be appreciated that it is preferred that the distribution of the contrast agent within the ventricle is substantially uniform. Furthermore, it is also preferred that the concentration is in a range for which equation 1 is linear. That is to say, in range where the absorbance is directly proportional to the concentration of the contrast agent.

The X-ray sensitive screen can be oriented perpendicularly relative to the direction of X-rays propagation. However, the orientation may also differ from 90° provided that all X-rays traversing the object to be imaged impinge on the screen. The position of each pixel on the plane of symmetry may then be determined by projecting the image intensities from the screen to the plane of symmetry in a direction coincident with the path of the X-ray.

This method assumes that the heart is substantially parallel to the A-P plane. However, in practice the heart is at an angle relative to a normal to the A-P plane (back to front tilt). This angle is small when the heart is in the end diastole part of the cycle but is more pronounced at the end systole. Thus in a preferred embodiment the images will be acquired while the heart is at the end diastole. However, it will be appreciated that it is possible to compensate for this angle by orienting the X-ray beam accordingly as to align the beam so that the path of the rays within the ventricle is substantially perpendicular to the plane of symmetry.

The present invention has been described with regard to preferred embodiments. However, it will be obvious to persons skilled in the art that a number of variations and modifications can be made without departing from the scope of the invention as described herein.

What is claimed is:

1. A method for the three dimensional image reconstruction of single plane 2-dimensional X-ray image projection of an object having at least one plane of symmetry comprising:
   a) substantially uniformly filling the object with an X-ray contrast agent said contrast agent having a pre-selected concentration and absorption coefficient;
   b) irradiating said contrast agent-filled object with X-rays substantially perpendicular to said at least one plane of symmetry of the object;
   c) detecting said X-rays transmitted through said contrast agent-filled object to define a 2-dimensional projection image with pixels (x,y) having an intensity related to the absorbance of said contrast agent-filled object;
   d) processing said 2-dimensional projection image to reconstruct the 3-dimensional image of said object, said processing including determining a distance $D(x,y)$ travelled by said X-rays in the contrast agent-filled object by dividing the absorbance corresponding to the intensity of each pixel (x,y) by the concentration of the contrast agent within said object and multiplying the result thus obtained by the absorption coefficient of said contrast agent; dividing said distance $D(x,y)$ by 2 to define a $(+z)$ coordinate (equals to $+D(x,y)/2$) and a $(-z)$ coordinate (equals to $-D(x,y)/2$) for each pixel (x,y); such that for each pixel (x,y) there is:
      1) a $(+z)$ coordinate$=+D(x,y)/2$ and
      2) a $(-z)$ coordinate$=-D(x,y)/2$;
   e) using the x,y,z coordinates thus determined to reconstruct the 3 dimensional image in a 3-dimensional axis system in which the x-y plane is parallel to the plane of symmetry of said object.

2. A method for the three dimensional image reconstruction of single plane 2-dimensional X-ray image projection of an object having at least one plane of symmetry comprising:
   a) irradiating said object with X-rays substantially perpendicular to said at least one plane of symmetry of the object;
   b) detecting said X-rays transmitted through said object to define a 2-dimensional projection mask image with pixels (x,y) having an intensity related to the absorbance of said object;
   c) substantially uniformly filling the object with an X-ray contrast agent said contrast agent having a pre-selected concentration and absorption coefficient;
   d) irradiating said contrast agent-filled object with X-rays substantially perpendicular to said at least one plane of symmetry of the object;
   e) detecting said X-rays transmitted through said contrast agent-filled object to define a 2-dimensional projection live image with pixels (x,y) having an intensity related to the absorbance of said contrast agent-filled object;
   f) subtracting said mask image from said live image to obtain a 2- dimensional final image;
   d) processing said 2-dimensional final image to reconstruct the 3-dimensional image of said object, said processing including determining a distance $D(x,y)$ travelled by said X-rays in the contrast agent-filled object by dividing the absorbance corresponding to the intensity of each pixel (x,y) by the concentration of the contrast agent within said object and multiplying the result thus obtained by the absorption coefficient of said contrast agent; dividing said distance $D(x,y)$ by 2 to define a $(+z)$ coordinate (equals to $+D(x,y)/2$) and a $(-z)$ coordinate (equals to $-D(x,y)/2$) for each pixel (x,y); such that for each pixel (x,y) there is:
      1) a $(+z)$ coordinate$=+D(x,y)/2$ and
      2) a $(-z)$ coordinate$=-D(x,y)/2$;
   e) using the x,y,z coordinates thus determined to reconstruct the 3-dimensional image in a 3-dimensional axis system in which the x-y plane is parallel to the plane of symmetry of said object.

3. The method of claim 1 further comprising the step of storing the reconstructed 3-dimensional image.

4. The method of claim 3 further comprising the step of displaying the image on a display screen.

5. The method of claim 4 wherein the concentration of the contrast agent is determined by integrating the absorbance over all pixels of the 2-dimensional projection image; dividing the integrated absorbance by the absorption coefficient of the X-ray contrast agent and multiplying the result thus obtained by the volume of said object.

6. The method of claim 4 wherein the concentration of the contrast agent is determined by obtaining a first projection image perpendicular to the plane of symmetry; measuring the maximum width of said projection; obtaining a second projection parallel to the plane of symmetry and measuring the maximum absorbance of said projection; dividing the absorbance by said maximum width and multiplying the result thus obtained by the absorption coefficient of the X-ray contrast agent.

7. The method of claim 5 wherein the object is an organ.

8. The method of claim 7 wherein the organ is the left ventricle of a mammalian heart.

9. The method of claim 8 wherein the mode of filling the organ with an X-ray contrast agent is selected from IV, IC, and IA.

10. The method of claim 9 wherein the mode of X-ray contrast agent injection is IV.

11. The method of claim 10 wherein the X-ray contrast agent is an Iodine containing compound.

12. The method of claim 8 wherein the volume of said left ventricle is calculated by applying the formula $$V = \frac{8S^2}{3\pi L}$$

wherein V is the volume, S is the surface of the final 2-dimensional projection image and L is the length of the principal axis of said left ventricle as measured on said image.

13. The method of claim 1 wherein said X-rays are detected with an X-ray sensitive screen substantially parallel to said selected plane of symmetry.

14. The method of claim 1 wherein said X-rays are detected with an X-ray sensitive screen substantially non-parallel to said selected plane of symmetry.

15. The method of claim 14 wherein said 2-dimensional image is projected into a plane parallel to said plane of symmetry in a direction orthogonal to said plane parallel to said plane of symmetry prior to reconstructing the 3-dimensional image.

16. The method of claim 8 wherein said selected plane of symmetry is coincident with the anterior-posterior (A-P) plane of said ventricle.

17. The method of claim 8 wherein said mask and live images are acquired at the end diastolic part of the cardiac cycle.

18. The method of claim 2 further comprising the step of storing the reconstructed 3-dimensional image.

19. The method of claim 6 wherein the object is an organ.

20. The method of claim 2 wherein said X-rays are detected with an X-ray sensitive screen substantially parallel to said selected plane of symmetry.

21. The method of claim 2 wherein said X-rays are detected with an X-ray sensitive screen substantially non-parallel to said selected plane of symmetry.

* * * * *